(12) United States Patent  
O'Keene

(10) Patent No.: US 8,157,233 B2  
(45) Date of Patent: *Apr. 17, 2012

(54) TILT MOUNTING SYSTEM

(75) Inventor: Dugan O'Keene, Forest Park, IL (US)

(73) Assignee: Peerless Industries, Inc., Aurora, IL (US)

(*) Notice: Subject to any disclaimer, the term of this patent is extended or adjusted under 35 U.S.C. 154(b) by 75 days.

This patent is subject to a terminal disclaimer.

(21) Appl. No.: 12/785,966

(22) Filed: May 24, 2010

(65) Prior Publication Data

US 2010/0230564 A1 Sep. 16, 2010

Related U.S. Application Data

(63) Continuation of application No. 12/503,718, filed on Jul. 15, 2009, now Pat. No. 7,753,332, which is a continuation of application No. 11/357,348, filed on Feb. 17, 2006, now Pat. No. 7,641,163.

(60) Provisional application No. 60/728,945, filed on Oct. 21, 2005.

(51) Int. Cl.  
*E04G 3/00* (2006.01)

(52) U.S. Cl. ............. 248/292.14; 248/284.1; 248/299.1; 248/920; 248/923

(58) Field of Classification Search ............... 248/299.1, 248/292.14, 284.1, 286.1, 298.1, 917, 918, 248/919, 920, 921, 922, 923, 924; 403/113, 403/116, 117

See application file for complete search history.

(56) References Cited

U.S. PATENT DOCUMENTS

| | | | |
|---|---|---|---|
| 212,618 A | 2/1879 | Miller |
| 257,050 A | 4/1882 | Munson |
| 462,172 A | 10/1891 | Smith |
| 613,438 A | 11/1898 | Bailey |
| 1,282,489 A | 10/1918 | Strodel |
| 1,574,227 A | 2/1926 | Andersen |
| 1,628,218 A | 5/1927 | Beauchamp |

(Continued)

FOREIGN PATENT DOCUMENTS

EP 1 590 595 1/2007

(Continued)

OTHER PUBLICATIONS

U.S. Appl. No. 12/012,365, filed Jan. 31, 2008, O'Keene, Entire Application.

(Continued)

*Primary Examiner* — Terrell McKinnon  
*Assistant Examiner* — Steven Marsh  
(74) *Attorney, Agent, or Firm* — Foley & Lardner LLP

(57) ABSTRACT

An improved adjustable mounting system for mounting a flat panel display to a surface. A mounting bracket is configured to attach to the surface, while an adapter bracket is operatively connected to the mounting bracket and is configured to operatively connect to the flat panel display. At least one carrier mechanism operatively connects the mounting bracket and the adapter bracket, the first carrier mechanism positioned with a set of substantially straight guide paths or surfaces to couple the adapter bracket to the mounting bracket. When the flat panel display is operatively connected to the adapter bracket and the mounting bracket is attached to the surface, the flat panel display is generally selectively rotatably positionable about an axis substantially parallel to the surface as a result of the interaction of the first carrier mechanism with the set of substantially straight guide paths or surfaces.

20 Claims, 4 Drawing Sheets

U.S. PATENT DOCUMENTS

| | | |
|---|---|---|
| 1,977,153 A | 10/1934 | Spence, Jr. |
| 2,233,882 A | 3/1941 | Bobek |
| 2,466,219 A | 4/1949 | Farrell et al. |
| 2,734,708 A | 2/1956 | Cohn |
| 3,001,225 A | 9/1961 | Squire |
| 3,182,946 A | 5/1965 | Dudko |
| 3,574,340 A | 4/1971 | Busche |
| 4,483,803 A | 11/1984 | Rizkalla |
| 4,554,590 A | 11/1985 | Chelin et al. |
| 4,560,129 A | 12/1985 | Clayton |
| 4,621,782 A | 11/1986 | Carlson |
| 4,645,153 A | 2/1987 | Granzow et al. |
| 4,718,317 A | 1/1988 | Hensler |
| 4,814,759 A | 3/1989 | Gombrich et al. |
| 4,934,645 A | 6/1990 | Breslow |
| 5,037,050 A | 8/1991 | Lin et al. |
| 5,040,759 A | 8/1991 | Wainwright |
| 5,058,842 A | 10/1991 | Zemlin et al. |
| 5,139,223 A | 8/1992 | Sedighzadeh |
| 5,165,644 A | 11/1992 | Allen |
| 5,195,900 A | 3/1993 | Kumagai et al. |
| 5,322,255 A | 6/1994 | Garrett |
| 5,344,194 A | 9/1994 | Hatagishi et al. |
| D361,062 S | 8/1995 | Iino et al. |
| D361,068 S | 8/1995 | Brehmer et al. |
| 5,465,557 A | 11/1995 | Harte |
| 5,520,361 A | 5/1996 | Lee |
| 5,553,820 A | 9/1996 | Karten et al. |
| 5,582,375 A | 12/1996 | Martin |
| 5,584,735 A | 12/1996 | McMath |
| 5,634,622 A | 6/1997 | Pye |
| 5,664,752 A | 9/1997 | Matthiessen et al. |
| 5,713,549 A | 2/1998 | Shieh |
| 5,743,503 A | 4/1998 | Voeller et al. |
| 5,751,548 A | 5/1998 | Hall et al. |
| 5,768,648 A | 6/1998 | Skipp et al. |
| D395,892 S | 7/1998 | Solomon |
| 5,797,568 A | 8/1998 | Canton Gongora et al. |
| 5,842,672 A | 12/1998 | Sweere et al. |
| 5,854,735 A | 12/1998 | Cheng |
| 5,914,493 A | 6/1999 | Morita et al. |
| 5,918,841 A | 7/1999 | Sweere et al. |
| 5,924,665 A | 7/1999 | Sweere et al. |
| 5,941,493 A | 8/1999 | Cheng |
| 5,941,497 A | 8/1999 | Inoue et al. |
| 5,947,429 A | 9/1999 | Sweere et al. |
| D415,768 S | 10/1999 | Howell |
| 5,992,809 A | 11/1999 | Sweere et al. |
| 6,012,693 A | 1/2000 | Voeller et al. |
| 6,015,120 A | 1/2000 | Sweere et al. |
| 6,019,332 A | 2/2000 | Sweere et al. |
| 6,036,337 A | 3/2000 | Belfer |
| 6,042,068 A | 3/2000 | Tcherny |
| 6,045,103 A | 4/2000 | Costa et al. |
| 6,047,939 A | 4/2000 | Kim |
| 6,048,013 A | 4/2000 | Moilanen et al. |
| 6,068,227 A | 5/2000 | Morgan et al. |
| 6,098,562 A | 8/2000 | Förthmann |
| 6,102,348 A | 8/2000 | O'Neill |
| 6,113,047 A | 9/2000 | Wung et al. |
| 6,126,128 A | 10/2000 | Costa et al. |
| 6,189,850 B1 | 2/2001 | Liao et al. |
| D440,863 S | 4/2001 | Worrall |
| 6,213,438 B1 | 4/2001 | Ostby et al. |
| 6,213,821 B1 | 4/2001 | Bernloehr et al. |
| 6,244,552 B1 | 6/2001 | Adams et al. |
| 6,264,152 B1 | 7/2001 | Bloch et al. |
| 6,273,382 B1 | 8/2001 | Pemberton |
| 6,336,037 B1 | 1/2002 | Sekine et al. |
| 6,340,146 B1 | 1/2002 | Tzeng |
| 6,347,776 B1 | 2/2002 | Chuang |
| 6,354,549 B2 | 3/2002 | Sweere et al. |
| 6,361,012 B1 | 3/2002 | Chang |
| 6,367,756 B1 | 4/2002 | Wang |
| 6,378,830 B1 | 4/2002 | Lu |
| 6,394,403 B1 | 5/2002 | Hung |
| 6,402,109 B1 | 6/2002 | Dittmer |
| 6,409,127 B1 | 6/2002 | VanderHeide et al. |
| D460,078 S | 7/2002 | Li |
| 6,416,027 B1 | 7/2002 | Hart |
| 6,418,010 B1 | 7/2002 | Sawyer |
| 6,419,196 B1 | 7/2002 | Sweere et al. |
| 6,450,467 B2 | 9/2002 | Timm |
| 6,453,509 B1 | 9/2002 | Shin |
| 6,478,275 B1 | 11/2002 | Huang |
| 6,484,987 B2 | 11/2002 | Weaver |
| 6,494,429 B2 | 12/2002 | Tajima |
| 6,517,040 B1 | 2/2003 | Wen |
| 6,530,546 B1 | 3/2003 | Cyrell |
| 6,530,551 B2 | 3/2003 | Gan |
| 6,543,734 B2 | 4/2003 | Yeh |
| 6,554,238 B1 | 4/2003 | Hibberd |
| 6,554,242 B2 | 4/2003 | Kim |
| 6,559,829 B1 | 5/2003 | Matsuo et al. |
| 6,560,094 B2 | 5/2003 | Schmidt |
| 6,565,056 B2 | 5/2003 | Lin |
| 6,575,419 B1 | 6/2003 | Masuda et al. |
| D477,606 S | 7/2003 | Theis et al. |
| 6,585,203 B1 | 7/2003 | Euker |
| 6,592,090 B1 | 7/2003 | Li |
| 6,594,143 B2 | 7/2003 | Yano et al. |
| 6,604,722 B1 | 8/2003 | Tan |
| 6,654,235 B2 | 11/2003 | Imsand |
| 6,663,064 B1 | 12/2003 | Minelli et al. |
| 6,671,928 B2 | 1/2004 | Huang |
| 6,672,553 B1 | 1/2004 | Lin |
| 6,752,363 B2 | 6/2004 | Boele |
| D493,800 S | 8/2004 | Pfister |
| D494,596 S | 8/2004 | Pfister |
| D494,978 S | 8/2004 | Pfister |
| D495,713 S | 9/2004 | Pfister et al. |
| 6,905,101 B1 | 6/2005 | Dittmer |
| 6,923,413 B2 | 8/2005 | Dozier |
| 7,028,961 B1 | 4/2006 | Dittmer et al. |
| 7,036,787 B1 | 5/2006 | Lin |
| D530,595 S | 10/2006 | Lam |
| 7,152,836 B2 | 12/2006 | Pfister et al. |
| 7,178,775 B2 | 2/2007 | Pfister et al. |
| D558,562 S | 1/2008 | Ciungan et al. |
| D558,563 S | 1/2008 | Ciungan |
| D558,564 S | 1/2008 | Ciungan |
| D559,088 S | 1/2008 | Ciungan |
| D562,113 S | 2/2008 | Ciungan et al. |
| 7,334,766 B2 | 2/2008 | Ligertwood |
| D563,962 S | 3/2008 | Grey |
| 7,438,269 B2 | 10/2008 | Pfister et al. |
| 7,513,469 B1 | 4/2009 | Ciungan |
| 7,513,474 B2 | 4/2009 | Anderson et al. |
| 7,641,163 B2 | 1/2010 | O'Keene |
| 7,753,332 B2 * | 7/2010 | O'Keene .................. 248/292.14 |
| 2001/0050327 A1 | 12/2001 | Sweere et al. |
| 2002/0011544 A1 | 1/2002 | Bosson |
| 2002/0033436 A1 | 3/2002 | Peng et al. |
| 2002/0084396 A1 | 7/2002 | Weaver |
| 2002/0179801 A1 | 12/2002 | Kim |
| 2002/0190180 A1 | 12/2002 | Cotterill |
| 2003/0075653 A1 | 4/2003 | Li |
| 2003/0136888 A1 | 7/2003 | Boele |
| 2003/0154673 A1 | 8/2003 | MacGregor et al. |
| 2003/0201372 A1 | 10/2003 | Dozier |
| 2003/0227739 A1 | 12/2003 | Kim et al. |
| 2004/0011932 A1 | 1/2004 | Duff |
| 2004/0011938 A1 | 1/2004 | Oddsen, Jr. |
| 2004/0211870 A1 | 10/2004 | Bremmon et al. |
| 2004/0232298 A1 | 11/2004 | Bremmon et al. |
| 2004/0232301 A1 | 11/2004 | Bremmon et al. |
| 2004/0245420 A1 | 12/2004 | Pfister et al. |
| 2005/0051688 A1 | 3/2005 | Dittmer |
| 2005/0133678 A1 | 6/2005 | Dittmer |
| 2005/0263659 A1 | 12/2005 | Pfister et al. |
| 2006/0006296 A1 | 1/2006 | Morita |
| 2006/0065800 A1 | 3/2006 | Bremmon |
| 2006/0291152 A1 | 12/2006 | Bremmon |
| 2007/0023593 A1 | 2/2007 | Fedewa |
| 2007/0041150 A1 | 2/2007 | Short et al. |
| 2007/0090250 A1 | 4/2007 | O'Keene |
| 2007/0176067 A1 | 8/2007 | Monaco |

| | | |
|---|---|---|
| 2007/0262215 A1 | 11/2007 | Tan |
| 2008/0035813 A1 | 2/2008 | O'Keene et al. |
| 2008/0073471 A1 | 3/2008 | Beger |
| 2008/0156949 A1 | 7/2008 | Sculler et al. |
| 2008/0210837 A1 | 9/2008 | Burns |
| 2008/0315049 A1 | 12/2008 | Bailo et al. |
| 2009/0050763 A1 | 2/2009 | Dittmer |
| 2009/0084918 A1 | 4/2009 | Pfister et al. |

FOREIGN PATENT DOCUMENTS

| | | |
|---|---|---|
| JP | 2-95279 | 7/1990 |
| JP | 2001-034180 | 2/2001 |
| JP | 2001-309276 | 11/2001 |
| KR | 1989-0001804 | 4/1989 |
| KR | 1990-0002291 | 3/1990 |
| KR | 1990-0003540 | 4/1990 |
| KR | 1992-0002567 | 4/1992 |
| KR | 0176089 | 4/2000 |
| KR | 2002-0071289 | 9/2002 |
| WO | WO 00/73697 | 12/2000 |

OTHER PUBLICATIONS

Assembly Instructions for Adjustable Tilt Wall Mounts; Peerless Industries, Inc. Mar. 17, 1993.

Assembly Instructions for Retrofit Kit for Peerless Products with Adjustable Tilt Tray, Peerless Industries, Inc. Feb. 14, 1995.

"Installation and Assembly: OneMount™", Peerless Industries, Inc. Sep. 20, 2006.

* cited by examiner

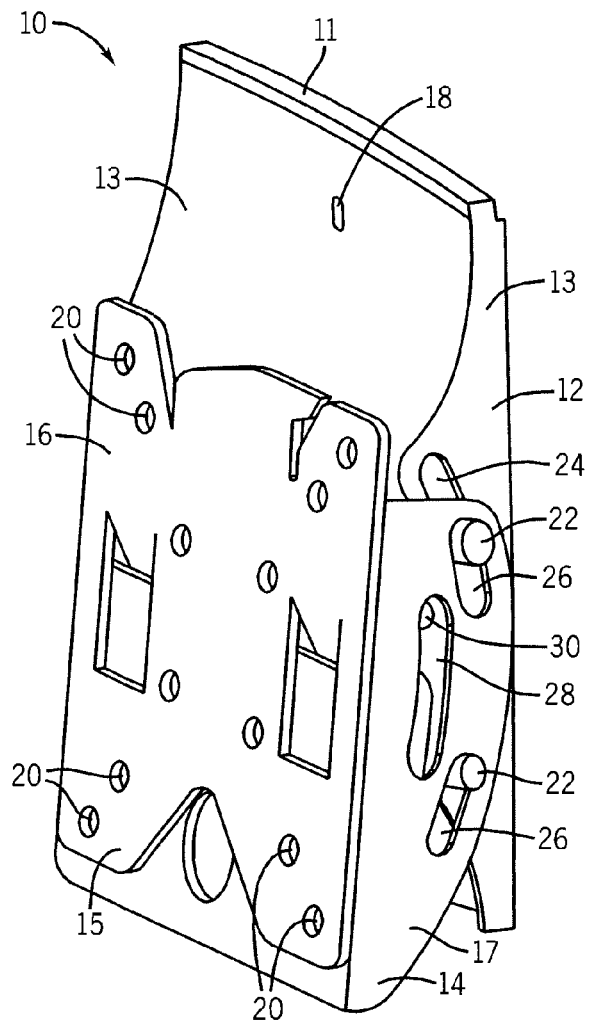
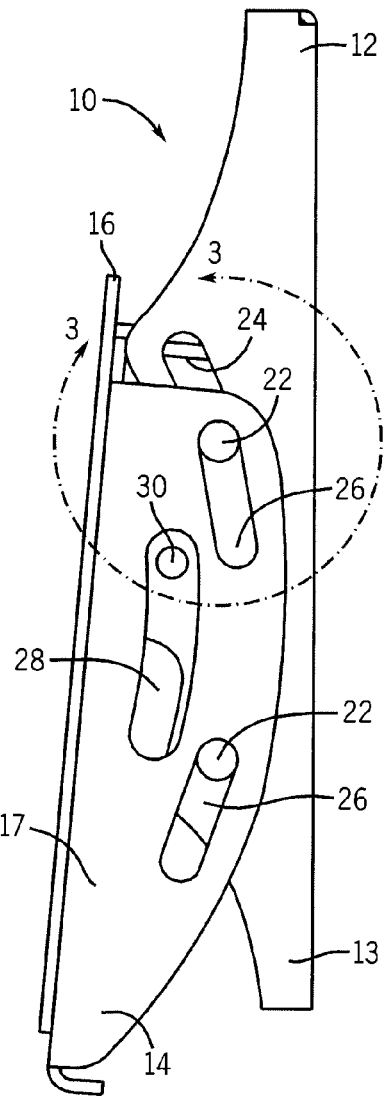
FIG. 1
FIG. 2

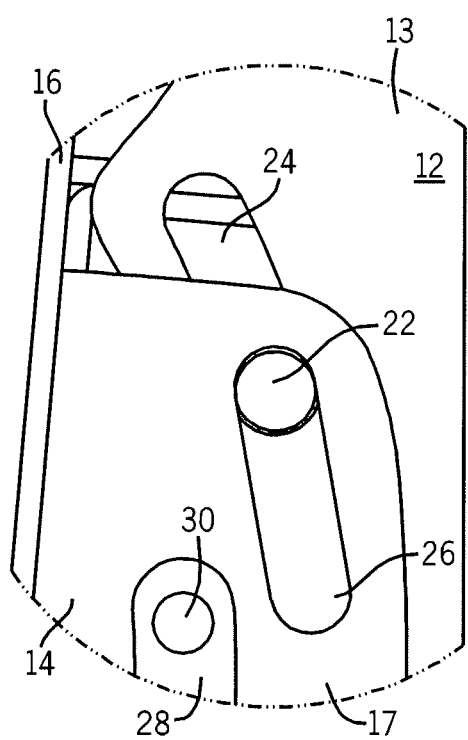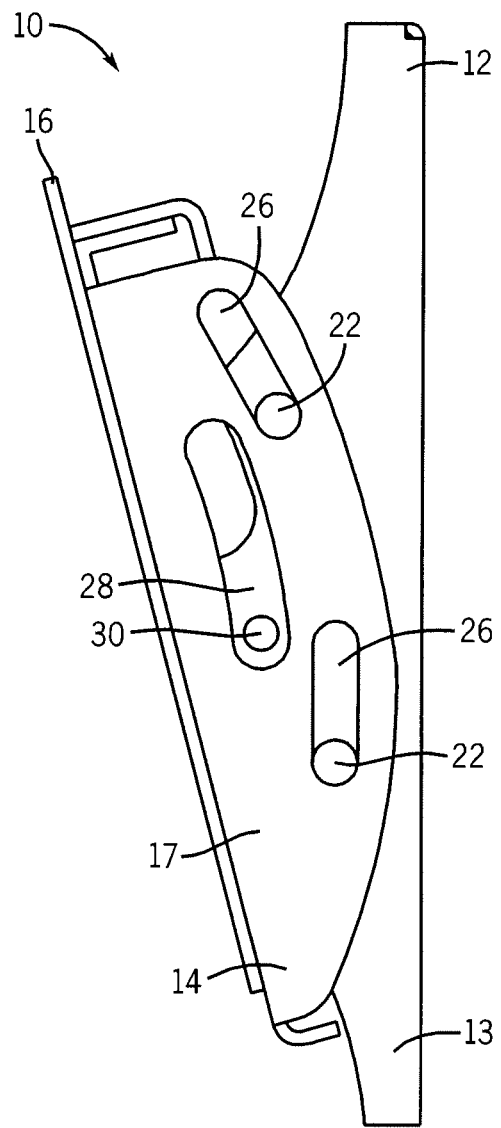
FIG. 3
FIG. 4

TILT MOUNTING SYSTEM

CROSS REFERENCE TO RELATED PATENT APPLICATIONS

This application is a continuation of U.S. patent application Ser. No. 12/503,718, filed Jul. 15, 2009, which is a continuation of U.S. patent application Ser. No. 11/357,348, filed Feb. 17, 2006, now U.S. Pat. No. 7,641,163, which claims priority to U.S. Provisional Patent Application No. 60/728,945, filed Oct. 21, 2005. The contents of these applications are incorporated herein by reference in their entirety.

FIELD OF THE INVENTION

The present invention relates generally to mounting systems. More particularly, the present invention relates to adjustable mounting systems for mounting devices such as flat panel televisions and displays on a surface.

BACKGROUND OF THE INVENTION

In recent years, flat-panel television units have become enormously popular in both the commercial and the residential sectors. As the prices for plasma and liquid crystal display (LCD) flat panel displays have continued to fall, and as the quality for the same devices have improved, more and more businesses and individuals have purchased such devices both for business and home entertainment purposes.

One of the advantages of flat-panel television units that customers have found particularly appealing is their relatively low thickness. Because conventional "tube" televisions have a relatively large depth, the display options for such devices are quite limited. In the residential setting, most users require a television stand or large entertainment center to store the television. Such stands or entertainment centers can take up significant floor space, which is often undesirable. In the commercial or educational setting, users will often install large overhead mounting systems that can contain the television. However, these systems usually require professional installation and, once the television is secured in the mount, it is often very difficult to access and adjust due to its height.

With flat-panel televisions, on the other hand, users are presented with a relatively new option: mounting the television directly to a wall or similar surface. By mounting the television to a wall, a person can eliminate the need to take up potentially valuable floor space with a television stand or entertainment unit. Furthermore, individuals and entities can mount the television at a sufficiently low height to be able to adjust the television's orientation with little difficulty.

Although the introduction of flat-panel televisions on a wide scale has presented new opportunities to both residential and commercial customers, it has also presented new challenges. Over the past few years, a number of wall mounting systems have been developed for use with flat panel televisions, but each has their own drawbacks. The products described in these disclosures rely upon the use of a set of curved slots to form a rotatable connection between a mounting bracket and a support bracket. Although moderately useful, a rolling connection among the slots is required for the smooth tilting movement of the mounting bracket relative to the support bracket. Unfortunately, the curved slots themselves can cause the mounting systems' rolling pins to slip during the tilting process, which can lead to the mounting bracket, and therefore the attached television or display, to move in an abrupt, non-smooth fashion relative to the support bracket. Such movements can make it difficult for one to precisely position the television or display in the desired position. Additionally, gravity can, on occasion, cause the rolling pins to fall within the slots, which can cause the system to bind. In such a situation, it becomes more difficult to adjust the orientation of the flat panel display. Furthermore, with some newer plasma and LCD televisions being more sensitive and delicate than conventional tube televisions, such sudden slippage could also damage the devices.

U.S. Application Publication No. 2004/0245420 discloses a mounting system where a plurality of arc-shaped glides are used in place of the rolling pins. However, such glides may be more expensive to manufacture than rolling pins, are more difficult to assemble into the curved slots than the rolling pins, and are prone to suffering wear to the frictional sliding of the glides against the sides of the slots.

It therefore would be desirable to develop an improved rotatable connection for tilt mounting systems that addresses the above-identified shortcomings.

SUMMARY OF THE INVENTION

The present invention comprises a self-balancing flat panel television or display mounting system. The mounting system is tiltable through the use of a plurality of substantially straight guide paths or surfaces formed with a mounting bracket and an adapter bracket, where carrier mechanisms are used to effectuate a smooth, rolling connection between the mounting bracket and the adapter bracket. In this arrangement, the resultant forces on the carrier mechanisms are oriented substantially perpendicular to the direction of the carrier mechanisms' travel, balancing the forces created by the supported load. By using a plurality of sets of guide paths with each support plate/mounting bracket combination, the guide paths create a "scissoring" action which diminishes sliding and promotes the smooth movement of the carrier mechanisms with the guide paths, as well as helping to ensure that the carrier mechanisms do not slip when a user or installer lifts and removes the television from the remainder of the mount.

These and other advantages and features of the invention, together with the organization and manner of operation thereof, will become apparent from the following detailed description when taken in conjunction with the accompanying drawings, wherein like elements have like numerals throughout the several drawings described below.

BRIEF DESCRIPTION OF THE DRAWINGS

FIG. 1 is a perspective view of a tilt mounting system constructed in accordance with one embodiment of the present invention;

FIG. 2 is a side view of the mounting system of FIG. 1 when in a first position;

FIG. 3 is a magnified view of the interaction among a carrier and a set of guide paths on the mounting bracket and support plate when in the position shown in FIG. 2;

FIG. 4 is a side view of the mounting system of FIG. 1 when in a second position;

DETAILED DESCRIPTION OF THE PREFERRED EMBODIMENTS

Figure 5:
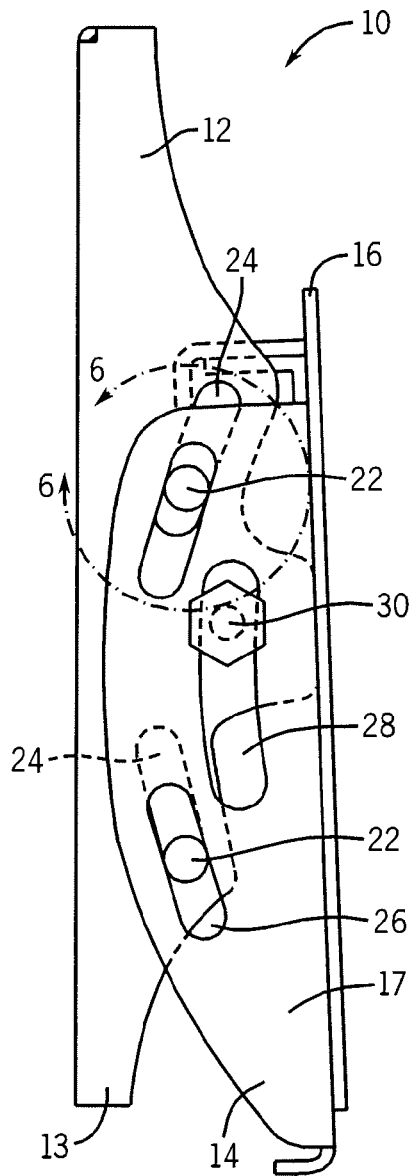
FIG. 5 is a side view of the mounting system of FIG. 1 when in an intermediate position.

FIGS. 1-6 show an adjustable mounting system 10 constructed in accordance with one embodiment of the present invention. The mounting system 10 of FIGS. 1-6 comprises a mounting bracket 12 which is configured to attach to a flat surface such as a wall. The mounting bracket includes a mounting bracket contact portion 11 and a pair of mounting bracket flanges 13 on each side thereof. In the embodiment shown in FIGS. 1-6, a plurality of mounting bracket holes 18 are strategically placed and sized within the mounting bracket contact portion 11 to attach the mounting bracket 12 to the wall. It should also be noted, however, that the mounting bracket 12 can be part of a larger support system, and that the attachment of the mounting bracket 12 to the wall does not have to be direct. Instead, the mounting bracket 12 can be connected to the wall via a plurality of intermediate components, such as an articulating arm (not shown) or other brackets or plates. These various components can be used to translation an attached electronic device away from or towards the wall, to tilt the electronic device to the left or right, or for other purposes.

In the embodiments shown in FIGS. 1-6, an adapter bracket 14 is rotatably coupled to the mounting bracket 12. Like the mounting bracket 12, the adapter bracket 14 includes an adapter bracket contact portion 15 bounded by a pair of adapter bracket flanges 17 on each side thereof in one embodiment of the invention. In the embodiment shown in FIGS. 1-6, a display bracket 16 is secured to the adapter bracket contact portion 15 and is configured to attach to a flat panel display or other electronic device via a plurality of display bracket holes 20. However, it should also be noted that, in other embodiments of the invention, the display bracket 16 is not necessary and the adapter bracket 14 can attached directly to the respective electronic device.

As shown in FIGS. 1-6, the mounting bracket 12 includes a plurality of mounting bracket guide paths 24, and the adapter bracket 14 includes a plurality of adapter bracket guide paths 26. FIGS. 1-6 show and describe the mounting bracket guide paths 24 and adapter bracket guide paths 26 as slots that are formed completely within the mounting bracket 12 and adapter bracket 14, respectively. However, it should be understood that the present invention is not strictly limited to the use of slots. Instead, guide paths for the mounting bracket 12 and the adapter bracket 14 can comprise items such as rails and outer surfaces that define a path of travel, as well as other structures that provide guide paths. The present invention should therefore not be strictly limited to the use of slots.

The mounting bracket guide paths 24 are located on the mounting bracket flanges 13, and the adapter bracket guide paths 26 are located on the adapter bracket flanges 17. In one embodiment of the invention, each mounting bracket flange 13 includes two mounting bracket guide paths 24, and each adapter bracket flange 17 includes two adapter bracket guide paths 26, each of which are configured to align with a respective mounting bracket guide path 24.

Importantly, both the mounting bracket guide paths 24 and the adapter bracket guide paths 26 are substantially straight in nature. In particular, each individual mounting bracket guide path 24 and adapter bracket guide path 26 does not possess any discernable radius of curvature along the longer edges of the guide paths that are closer to where the electronic device is mounted. In a preferred embodiment, the longer inner and outer edges of both the mounting bracket guide paths 24 and the adapter bracket guide paths 26 are substantially straight and possess no discernable radius of curvature. Both the mounting bracket guide paths 24 and the adapter bracket guide paths 26 are sized to accept a carrier 22 therethrough. FIGS. 1-6 show the carrier mechanisms 22 as comprising rolling pins. However, other types of carriers, such as gliders or other items, could also be used. In one particular embodiment of the invention, two rolling pins are used, with one rolling pin passing through the uppermost mounting bracket guide paths 24 and adapter bracket guide paths 26 on each of the respective flanges, and another rolling pin passing through the lowermost mounting bracket guide paths 24 and adapter bracket guide paths 26 on each of the respective flanges.

Figure 6:
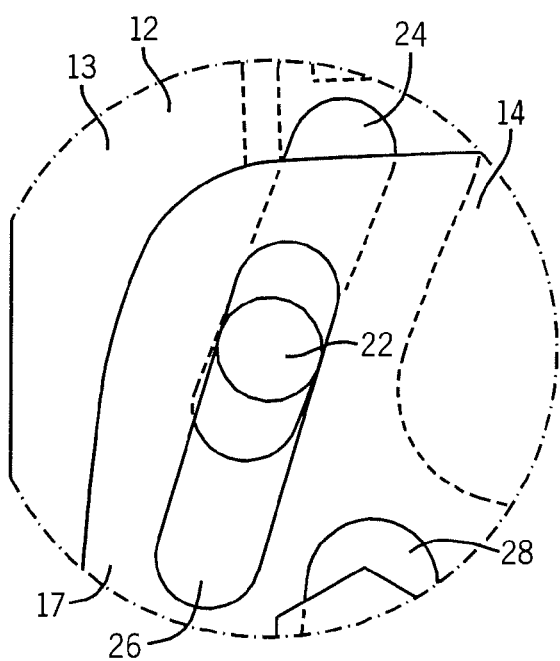
FIG. 6 is a magnified view of the interaction among a carrier mechanism and a set of guide paths on the mounting bracket and support plate when in the position shown in FIG. 5.

The different positions of the mounting system 10 shown in FIGS. 2-6 show the relative movement of the adapter bracket 14, and therefore any attached electronic device, relative to the mounting bracket 12. FIGS. 2 and 3 show the adapter bracket 14 in a first position, where the adapter bracket 14 (and the electronic device) are angled upward to the greatest extent permitted by the mounting system 10. Conversely, FIG. 4 shows the adapter bracket 14 in a second position, where the adapter bracket 14 (and the electronic device) are angled downward to the greatest extent permitted by the mounting system 10. FIGS. 5 and 6 show the adapter bracket 14 in an intermediate position, about half way between the position shown in FIGS. 2 and 3 and the position shown in FIG. 4.

In the position shown in FIGS. 2 and 3, the carriers 22 are positioned at the top most regions of the respective adapter bracket guide paths 26 and the lower most regions of the respective mounting bracket guide paths 24. In contrast, when the adapter bracket 14 is positioned as shown in FIG. 4, the carriers 22 are positioned at the lower most regions of the respective adapter bracket guide paths 26 and the top most regions of the respective mounting bracket guide paths 24. At all times during the motion process, the adapter plate 14 and attached electronic device exert a normal force against the carrier 22 in the uppermost guide paths, with the force being normal to a major axis of the respective mounting bracket guide paths 24. In a preferred embodiment of the invention, the mounting bracket guide paths 24 on each mounting bracket flange 13 are oriented such that lines normal to the major axes of each mounting bracket guide path 24 will intersect at a point within the vicinity of the center of gravity of a flat panel display or television when properly secured to the adapter bracket 14. As a result of this arrangement, the flat panel display or television does not tend to tilt on its own without the imposition of outside forces (typically imposed by a user who wants to change the orientation of the flat panel display.)

During the process of adjusting the tilt of the adapter bracket 14 relative to the mounting bracket 12, the position of the adapter bracket guide paths 26 is adjusted relative to the position of the corresponding mounting bracket guide paths 24. This movement can be described as a "scissors style" movement, with the interaction of the guide paths resembling the interaction of two scissor blades during a cutting process. As a result of this scissors style relative motion, the forces that are exerted on the carriers 22 promotes the rolling of the carriers 22 within the respective guide paths and works to help prevent any sliding action of the carriers 22. As any sliding of the carriers 22 within the guide paths can lead to an uneven and/or unbalanced movement of the adapter bracket 14 and electronic device relative to the mounting bracket 12, the use of straight guide paths, and therefore the resultant scissors style movement, aids in permitting a smooth and consistent adjustment process. This makes it easier for the user to place the electronic device at a desired orientation. Additionally, the improved rolling action also prevents slippage and instability when a user attempts to remove the electronic device/adapter bracket 14 combination from the mounting bracket 12 when necessary or desired.

In alternative embodiments of the present invention, it is not necessary for each mounting bracket guide path 24 to have a corresponding adapter bracket guide path 26. For example, it is possible, instead of having adapter bracket guide paths 26 at all, the adapter can include a plurality of holes just large enough to permit the carrier 22 roll therein, with each hole corresponding to a mounting bracket guide path 24. Alternatively, this arrangement can be reversed, where the mounting bracket flanges 13 each possess a hole that corresponds to a respective adapter bracket guide path 26.

The embodiment of the invention shown in FIGS. 1-6 also includes a friction member 30 for adjusting the level of resistance that is met during the adjustment process. In one particular embodiment, the friction member 30 includes an adjustment screw that passes through both an adapter plate friction slot 28 and a hole (not shown) in the corresponding mounting plate flange 13. It should be noted that the hole and slot can also be reversed, such that the friction slot appears on the mounting bracket 12. A plurality of washers (not shown) may also be used along with the adjustment screw. In this embodiment of the invention, a clockwise rotation of the adjustment screw causes the respective adapter bracket flange 17 and mounting bracket flange 13 to come into closer contact with each other, which results in an increased level of friction when the user moves the flat panel display (and therefore the adapter bracket 14) relative to the mounting bracket 12. A counterclockwise rotation of the adjustment screw correspondingly reduces the friction level between the mounting bracket 12 and the adapter bracket 14. It should be understood that other types of friction devices may also be used, and that these friction devices may or may not include an adjustment screw of the type described herein.

Figure 7:
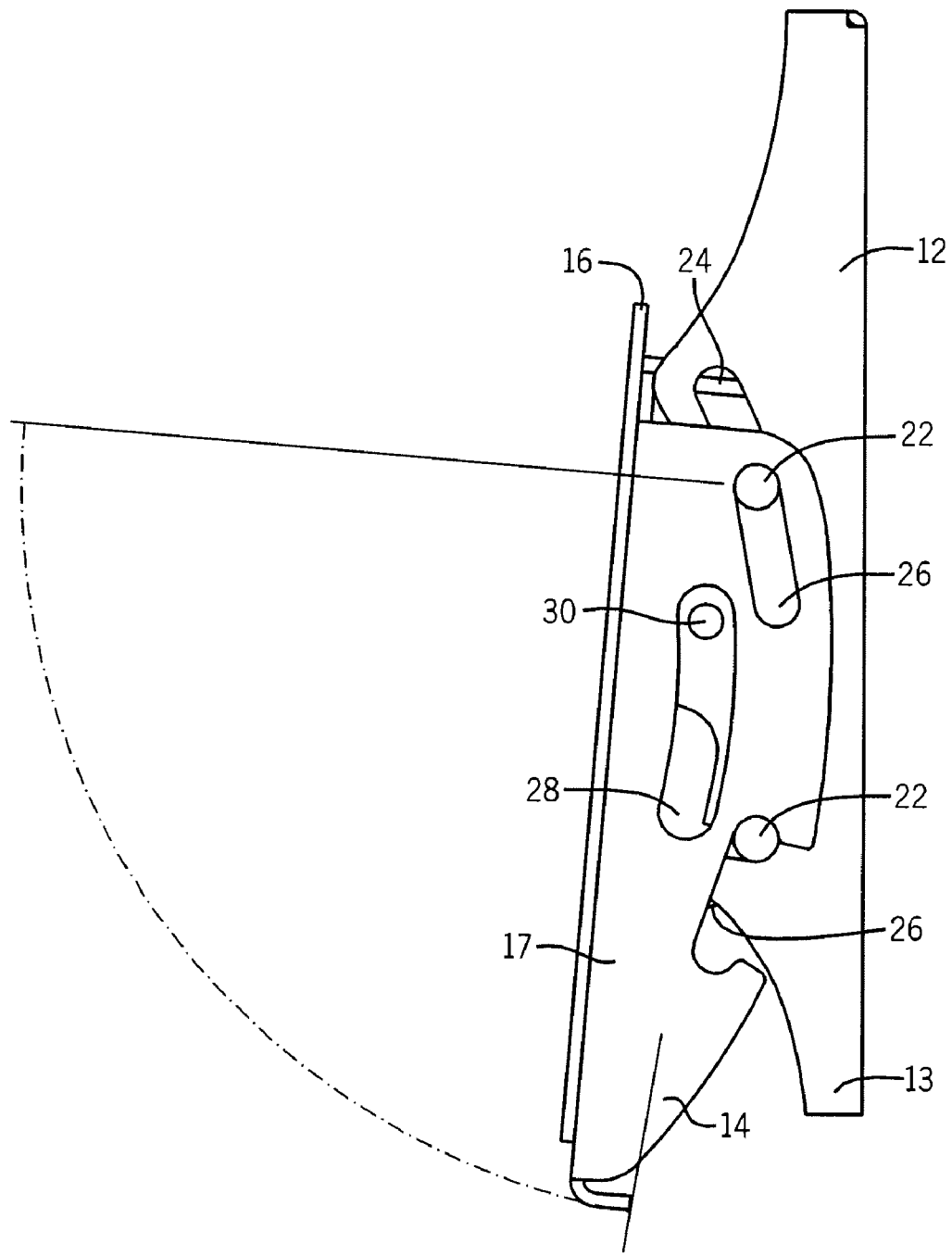
FIG. 7 is a side view of a mounting system constructed according to an alternative embodiment of the present invention.

FIG. 7 shows an additional embodiment of the present invention, where the adapter bracket 14 includes a guide path 26 which is an open-back rolling surface instead of a slot. In this particular embodiment, if a user needs to perform an action under the television or display such as accessing cables, he or she can rotate the adapter bracket 14 relative to the mounting bracket 12 about an axis defined by the upper carrier mechanism 22. This action provides a user with improved access to the back side of the device without having to completely remove the adapter bracket 14.

The foregoing description of embodiments of the present invention have been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principles of the present invention and its practical application to enable one skilled in the art to utilize the present invention in various embodiments and with various modifications has are suited to the particular use contemplated.

What is claimed is:

1. An adjustable mounting system for mounting a flat panel display to a surface substantially perpendicular to the ground, comprising:
   a mounting bracket configured to operatively connect to the surface;
   an adapter bracket operatively connected to the mounting bracket and configured to operatively connect to a flat panel display; and
   a plurality of carriers operatively connecting the mounting bracket and the adapter bracket, each of the plurality of carriers interacting with a plurality of substantially straight guide paths located on one of the mounting bracket and the adapter bracket to couple the adapter bracket to the mounting bracket so that, when the flat panel display is operatively connected to the adapter bracket and the mounting bracket is attached to the surface, the flat panel display is selectively positionable between an upwardly tilted position and a downwardly tilted position about an axis located apart from the plurality of carriers, the axis substantially parallel to the ground as a result of the interaction between the at least one carrier and the plurality of substantially straight guide paths.

2. The adjustable mounting system of claim 1, wherein the plurality of substantially straight guide paths comprise substantially straight mounting bracket guide paths included within the mounting bracket.

3. The adjustable mounting system of claim 1, wherein the plurality of substantially straight guide paths comprise substantially straight adapter bracket guide paths included within the adapter bracket.

4. The adjustable mounting system of claim 1, wherein each of the plurality of carriers interact with a plurality of substantially straight guide paths on both of the mounting bracket and the adapter bracket.

5. The adjustable mounting system of claim 1, further comprising a display bracket directly coupled to the adapter bracket and adapted to directly connect to the flat panel display.

6. The adjustable mounting system of claim 1, further comprising a friction assembly operatively coupled to the mounting bracket and the adapter bracket, the friction assembly permitting a user to selectively adjust the amount of friction existing between the mounting bracket and the adapter bracket during rotation of the flat panel display.

7. The adjustable mounting system of claim 1, wherein the mounting bracket includes a mounting bracket contact surface and first and second mounting bracket flanges substantially perpendicular to the mounting bracket contact surface, the first and second mounting bracket flanges each including at least one of the plurality of substantially straight guide paths.

8. The adjustable mounting system of claim 1, wherein the adapter bracket includes an adapter bracket contact surface and first and second adapter bracket flanges substantially perpendicular to the adapter bracket contact surface, the first and second adapter bracket flanges each including at least one of the plurality of substantially straight guide paths.

9. A mounting system for mounting a device to a surface, comprising:
   a mounting bracket configured for operative attachment to a mounting surface;
   an adapter bracket operatively connectable to a device, the adapter bracket moveably coupled to the mounting bracket, the adapter bracket comprising a first set of flanges, the first set of flanges including a first substantially straight adapter bracket guide path characterized by a first adapter bracket guide path major axis and a second substantially straight adapter bracket guide path characterized by a second adapter bracket guide path major axis noncolinear with and intersecting the first adapter bracket guide path major axis;
   a first carrier received by the first substantially straight adapter bracket guide path of the first set of flanges and operatively coupled to the mounting bracket; and a second carrier received by the second substantially straight adapter bracket guide path of the first set of flanges and operatively coupled to the mounting bracket, wherein the adapter bracket is selectively positionable in relation to the mounting bracket by way of interaction of the first carrier and the second carrier with the mounting bracket and the adapter bracket.

10. The mounting system of claim 9, wherein the mounting bracket includes a first mounting bracket opening configured to receive the first carrier.

11. The mounting system of claim 10, wherein the first mounting bracket opening comprises a first substantially straight mounting bracket guide path.

12. The mounting system of claim 11, wherein the mounting bracket includes a second mounting bracket opening configured to receive the second carrier.

13. The mounting system of claim 12, wherein the second mounting bracket opening comprises a second substantially straight mounting bracket guide path, the second substantially straight mounting bracket guide path being noncolinear with the first substantially straight mounting bracket guide path.

14. The mounting system of claim 9, wherein the mounting bracket includes a second set of flanges, and wherein the first carrier and the second carrier interact with the second set of flanges, thereby allowing the adapter bracket to be selectively positionable in relation to the mounting bracket.

15. A mounting system for mounting a device to a surface, comprising:
   a mounting bracket configured for operative attachment to a mounting surface the mounting bracket comprising a first set of flanges, the first set of flanges including a first substantially straight mounting guide path characterized by a first mounting guide path major axis and a second substantially straight mounting guide path characterized by a second mounting guide path major axis noncolinear with and intersecting the first mounting guide path major axis;

an adapter bracket operatively connectable to a device, the adapter bracket moveably coupled to the mounting bracket, a first carrier received by the first substantially straight mounting guide path of the first set of flanges and operatively coupled to the adapter bracket; and a second carrier received by the second substantially straight mounting guide path of the first set of flanges and operatively coupled to the adapter bracket, wherein the adapter bracket is selectively positionable in relation to the mounting bracket by way of interaction of the first carrier and the second carrier with the adapter bracket and the mounting bracket.

16. The mounting system of claim 15, wherein the adapter bracket includes a first adapter bracket opening configured to receive the first carrier.

17. The mounting system of claim 16, wherein the first adapter bracket opening comprises a first substantially straight adapter bracket guide path.

18. The mounting system of claim 17, wherein the adapter bracket includes a second adapter bracket opening configured to receive the second carrier.

19. The mounting system of claim 18, wherein the second adapter bracket opening comprises a second substantially straight adapter bracket guide path, the second substantially straight adapter bracket guide path being noncolinear with the first substantially straight adapter bracket guide path.

20. The mounting system of claim 15, wherein the adapter bracket includes a second set of flanges, and wherein the first carrier and the second carrier interact with the second set of flanges, thereby allowing the adapter bracket to be selectively positionable in relation to the mounting bracket.

* * * * *